United States Patent
Klamer et al.

(10) Patent No.: US 7,805,011 B2
(45) Date of Patent: Sep. 28, 2010

(54) METHOD AND APPARATUS FOR PROVIDING LOSSLESS DATA COMPRESSION AND EDITING MEDIA CONTENT

(75) Inventors: Paul Klamer, La Canada, CA (US); Arjun Ramamurthy, Glendale, CA (US); Darcy Antonellis, Granda Hills, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1021 days.

(21) Appl. No.: 11/531,376

(22) Filed: Sep. 13, 2006

(65) Prior Publication Data

US 2008/0063287 A1  Mar. 13, 2008

(51) Int. Cl.
*G06K 9/36* (2006.01)
*G06K 9/46* (2006.01)
*G06K 9/66* (2006.01)

(52) U.S. Cl. .................. 382/232; 382/190

(58) Field of Classification Search ......... 382/162, 382/164, 167, 172, 173, 190, 218–220, 232, 382/244, 272, 276, 277; 345/619; 705/51; 707/E17.028, E17.124; 709/203, 223, 231, 709/246

See application file for complete search history.

(56) References Cited

U.S. PATENT DOCUMENTS

| | | | |
|---|---|---|---|
| 6,593,936 B1 * | 7/2003 | Huang et al. | 345/619 |
| 7,185,049 B1 * | 2/2007 | Benitez et al. | 709/203 |
| 7,369,677 B2 * | 5/2008 | Petrovic et al. | 382/100 |
| 7,464,171 B2 * | 12/2008 | Rambhia | 709/231 |
| 2003/0200336 A1 * | 10/2003 | Pal et al. | 709/246 |
| 2003/0217007 A1 * | 11/2003 | Fukushima et al. | 705/51 |
| 2008/0063287 A1 * | 3/2008 | Klamer et al. | 382/232 |

* cited by examiner

*Primary Examiner*—Amir Alavi
(74) *Attorney, Agent, or Firm*—Connolly Bove Lodge & Hutz LLP; Jonathan A. Jaech

(57) ABSTRACT

A method and a related apparatus for compressing images included in media content and editing the media content. The method can include providing an image-matching algorithm and a memory device, using the image-matching algorithm to identify images that are similar in a selection of media content extracting the images that are similar from the selection of media content, storing a single image that represents the extracted images in the memory device, and replacing the extracted images in the selection of media content with a metadata link that points to the single image. The method can further include providing a previously edited video program that originally was created from film footage, determining which of the video fields from the program include a unique film frame from the footage, and extracting the video fields from the program that include a unique film frame.

18 Claims, 8 Drawing Sheets

72 ↘

| Frame # | Keycode # | Duration(ms) | Scene | Take |
|---|---|---|---|---|
| 1 | KK123-1234-1200+02 | 33.37 | 5a | 2 |
| 2 | KK123-1234-1200+03 | 50.05 | 5a | 2 |
| 3 | KK123-1234-1200+04 | 33.37 | 5a | 2 |
| 4 | KK123-1234-1200+05 | 50.05 | 5a | 2 |

| Frame # | Keycode # | Duration(ms) | Scene | Take |
|---|---|---|---|---|
| 1 | KK123-1234-1200+02 | 33.37 | 5a | 2 |
| 2 | KK123-1234-1200+03 | 33.37 | 5a | 2 |
| 3 | KK123-1234-1200+04 | 33.37 | 5a | 2 |
| 4 | KK123-1234-1200+05 | 50.05 | 5a | 2 |
| 5 | KK123-1234-1200+06 | 33.37 | 5a | 2 |
| 6 | KK123-1234-1200+07 | 50.05 | 5a | 2 |

| Frame # | Keycode # | Duration(ms) | Scene | Take | Speed | Shot |
|---|---|---|---|---|---|---|
| 1 | KK123-1234-1200+02 | 33.37 | 5a | 2 | | 144 |
| 2 | KK123-1234-1200+03 | 33.37 | 5a | 2 | | 144 |
| 3 | KK123-1234-1200+04 | 33.37 | 5a | 2 | | 144 |
| 4 | KK123-1234-1200+05 | 50.05 | 5a | 2 | | 144 |
| 5 | KK123-1234-1200+06 | 33.37 | 5a | 2 | | 144 |
| 6 | KK123-1234-1200+07 | 50.05 | 5a | 2 | | 144 |
| 7 | KK123-1234-1200+08 | 33.37 | 5a | 2 | | 144 |
| 8 | KK123-1234-1200+09 | 33.37 | 5a | 2 | | 144 |
| 9 | KK123-1234-1200+10 | 50.05 | 5a | 2 | | 144 |
| 10 | KK123-1234-1200+11 | 33.37 | 5a | 2 | | 144 |
| 11 | KK123-1234-1200+12 | 50.05 | 5a | 2 | | 144 |
| 12 | KK123-1234-1200+13 | 33.37 | 5a | 2 | | 144 |
| 13 | KK123-1234-1200+14 | 33.37 | 5a | 2 | | 144 |
| 14 | KK123-1234-1200+15 | 50.05 | 5a | 2 | | 144 |
| 15 | KK123-1234-1201+00 | 33.37 | 5a | 2 | | 144 |
| 16 | KK123-1234-1201+01 | 50.05 | 5a | 2 | | 144 |
| 17 | KK123-1234-1201+02 | 33.37 | 5a | 2 | | 144 |
| 18 | KK123-1234-1201+03 | 33.37 | 5a | 2 | | 144 |
| 19 | KK123-1234-1201+04 | 50.05 | 5a | 2 | 25.31Fps | 144 |
| 20 | KK321-4321-1000+15 | 33.37 | 146 | 3 | | 145 |
| 21 | KK321-4321-1001+00 | 50.05 | 146 | 3 | | 145 |
| 22 | KK321-4321-1001+01 | 33.37 | 146 | 3 | | 145 |
| 23 | KK321-4321-1001+02 | 50.05 | 146 | 3 | | 145 |
| 24 | KK321-4321-1001+03 | 33.37 | 146 | 3 | | 145 |
| 25 | KK321-4321-1001+04 | 50.05 | 146 | 3 | | 145 |
| 26 | KK321-4321-1001+05 | 33.37 | 146 | 3 | | 145 |
| 27 | KK321-4321-1001+06 | 50.05 | 146 | 3 | | 145 |
| 28 | KK321-4321-1001+07 | 33.37 | 146 | 3 | | 145 |
| 29 | KK321-4321-1001+08 | 50.05 | 146 | 3 | | 145 |
| 30 | KK321-4321-1001+09 | 33.37 | 146 | 3 | | 145 |
| 31 | KK321-4321-1001+10 | 50.05 | 146 | 3 | 23.98Fps | 145 |
| 32 | KK321-5562-1000+12 | 50.05 | 7b | 1 | | 146 |

FIG. 8

METHOD AND APPARATUS FOR PROVIDING LOSSLESS DATA COMPRESSION AND EDITING MEDIA CONTENT

BACKGROUND OF THE INVENTION

1. Field of the Invention

The invention relates generally to the field of image processing. More specifically, the invention relates to a method and apparatus for providing lossless data compression and editing media content.

2. Description of the Related Art

Current motion picture productions generate vast amounts of film footage throughout the course of a feature's creation. Often shot on location or on elaborate sets, production of a feature is expensive, and production cost is measured by the number of production days expected. Recognizing that a production day must he fully utilized and likely not re-duplicated or re-scheduled, scenes are shot several times to ensure that the creative intent for the feature is captured. This safeguard generates a large amount of original film footage.

It has been estimated that a standard feature production has a cutting ratio of approximately 20:1. Therefore, for a typical two-hour feature presentation, approximately 40 hours of film footage is gathered, in a big budget production, it is not unreasonable to expect about one million feet of film. To be able to provide the production with the entire assets of 40 hours of film, whenever they are desired, it would be necessary to have approximately 3.45 million film frames available, 40 hours of film footage being $3.45 \times 10^6$ frames (40 hours$\times$60 minutes/hour$\times$60 seconds/minute$\times$24 frames/second=$3.45 \times 10^6$ frames total). Assuming that the footage data has a resolution of 2048$\times$1742 at 10 bits (2K) and is not compressed, and has a 2.35 aspect ratio ("AR"), this amounts to approximately 12 megabytes ("MB") of storage per frame. The footage data would therefore require about 40 terabytes ("TB") of storage space. For 4K resolutions, the storage requirements would increase by a factor of four, thus, one million feet of film footage would require 160 TB of storage space. Over and above these large and expensive storage requirements, the asset tracking, identification, and management of this data is an extremely expensive and difficult task, Another problem arises when it is desired to re-edit legacy television programs from original footage. Most legacy television programs, i.e., television programs from a previous time or generation, were created from film sources, and assembled using video processes. As a result, the original film footage of many legacy television shows, which typically have very high resolutions, cannot be reused to recreate the final-cut version of the television programs in a higher resolution or a different format. This is because, even though the original film footage exists, the edit lists that were used to create the final-cut version of the television program are no longer available. As a result, it cannot be determined which frames from the original film footage were used to create the final-cut version of the television programming.

Traditionally, motion pictures have been captured on film at a rate of 24 frames/second at a very high resolution (e.g., 4K resolution). Once all the original film footage has been taken and reviewed, edit lists are created, and the uncut portions of the film are typically converted to another, more usable format. For example, the original film can be transferred to video, which is shown at a rate of 60 fields/second. Due to advances in technology, viewers of television and motion pictures now expect a relatively high-resolution picture qualify. Therefore, content providers often need to provide their motion picture content in a higher resolution than it originally was created. Unfortunately, reusing the original film footage to create the edited material in a higher-resolution format is extremely difficult because the edit list that was used to create the edited material typically is not available. Without the edit list, it is a very difficult and time-consuming process to determine which film frames were used in the video program and which film frames were cut from the original video program.

Conventional processes for converting film to video have been around for many years and are well known in the art. The typical method involves converting the 24 frames/second of film to 60 fields/second of video. Through this process, four frames of a film are converted to ten video fields. This is accomplished by adding redundant frames from the film to the video fields to make up for the difference in the number of images shown per second between the two formats. Typically, this is done by taking each of the four frames from the film and alternating showing each of those frames for either two or three fields. A typical four film-frame sequence 10 is shown in FIGS. 1 and 2. Using this method, two of the film frames 12 and 14 (i.e., film frames A and C) would be shown for two video fields 16 and 18, respectively, each (four video fields 20 total) and the other two film frames 22 and 24 (i.e., film frames B and D) would be shown for three video fields 26 and 28, respectively, each (six video fields total), totaling ten fields of video that were created from the four frames of original film footage. This method is repeated for the 20 remaining frames of film in the second of footage to create 60 fields/second of video programming. As shown in FIG. 2, the video fields alternate between being a video field one 30 and a video field two 32. Each video field includes half of the scan lines, i.e., every other scan line, that are displayed on a video output device, e.g., a monitor.

Unfortunately, the process of converting film 34 to video 36 described above results in some of the frames 12 and 14 of the film being shown for two video fields 16 and 18, respectively, while other frames 22 and 24 of the film are shown for three video fields 26 and 28, respectively. Showing some film frames for a longer period of time than others results in a staggered timeline having undesirable motion artifacts in the video program. These artifacts are not acceptable by today's standards. Additionally, video content typically is delivered on optical disc, e.g., digital video disc ("DVD"), or transmitted using a data transmission line or related method, e.g., Video on Demand ("VOD"). As a result content providers want to provide as much high-resolution content on a DVD or within the available bandwidth of the data transmission line. Space on a DVD or bandwidth of a data transmission line cannot be wasted. Therefore, it is no longer acceptable to provide video content that contains redundant fields from the original film frames.

Additionally, many difficulties exist with trying to extract the original frames 12 from a video source 36 that contains redundant images. For example, the practice of varying the speed of the film material 34 when creating a video program makes it difficult to identify and remove the original film frames of the film source. In a variable-speed process, the film is not run at the typical 24 frames/second, but rather at a subtly faster or slower speed to shorten or lengthen the resulting video program. This is typically done either to accommodate commercial breaks in the video program, or to vary the pace of the video program on a scene-by-scene basis. As a result a video program that results from the variable-speed process does not contain the 2:3 field sequence (or 3:2 field sequence) described above. Instead, the speeding up or slowing down of the film frames through the variable-speed process results in a seemingly random sequence of two and three video fields 16 and 26, respectively. For example, to lengthen a 24 film frame scene from the 60 video fields it would normally be, to a new length of 66 video fields, the sequence might be 3,2,3,3,3,3, 2,3,3,3,3,2,3,2,3,3,3,3,2,3,3,3,3,2 ("the first sequence"), or it could be 3,3,3,3,3,3,2,3,2,3,3,2,3,3,3,3,3,3,2,3,2,3,3,2 ("the second sequence"). These two sequences are virtually indistinguishable to the viewer. To further complicate matters, no standards have ever existed for modifying the 2:3 field sequence (or 3:2 field sequence) using the variable-speed process, in fact, the same variable-speed device can create the first sequence referenced above, and then, immediately afterwards, create the second sequence referenced above, when varying the speed of the same film material.

Another problem that is associated with determining the original film frames 12 in the previously discussed 2:3 (or 3:2) sequence is caused by various post-production practices. Most notably, the post-production practices of fixed-field dominance, i,e., the starting of every new shot on either video field one 30 or video field two 32, and video-switcher effects create additional problems with identifying the original film frames in the resulting video program 36. In the past, video editors could edit video field one or video field two, but lacked the precision to reliably edit on all the video fields 20 that required editing. Typically, video editors would make all of their edits on video field one. However, as shown in FIG. 1, only two film frames 12 and 14 of the four film-frame sequence 10 started on video field one. The other two film frames 22 and 24 start on video field two. The same is true on the out points or last field of edits. Assuming you have a section of film having four film frames A-D, like the frames shown in FIG. 1 if the video editor makes a field one dominant edit on an "A" frame 12 or a "B" frame 22 then no problem arises, however, if the dominant edit is on a "C" frame 14, then an orphaned video field is produced with only half of the vertical resolution. The orphaned video field has only half the resolution because only one video field of a given image is available, if the film frame that you are editing to is a "D" frame 24, then you have shortened three video fields to two video fields since the "D" frame starts on video field two, effectively converting a "D" frame to an "A" frame. This can result in temporal discontinuity, which results in a bump or jerk in the motion of a scene with a lot of movement in the resulting video program.

Similarly, video-switcher effects, such as dissolves or fades to black, create additional problems with identifying original film frames 12 included in the video program 36. These video-switcher effects were commonly done using 60-field video switchers. One can appreciate that in a 60 fields/second fade to black, every video field 20 is unique. As a result, determining which two or three video fields comprise a unique film frame becomes difficult and complicated.

Accordingly, it should be appreciated that there is a need for a method and an apparatus that provides lossless data compression of large amounts of film footage 10 and accurately determines and separates unique film frames 12 from video 36. The present invention satisfies these needs and provides other related advantages.

SUMMARY OF THE INVENTION

The present invention includes a method and an apparatus for compressing images in a lossless manner and editing media content. An exemplary method according to the present invention is a method for compressing images included in a selection of media content. The method includes providing an image-matching algorithm and a memory device, using the image-matching algorithm to identify images that are similar in the selection of media content, extracting the images that are similar from the selection of media content, storing a single image that represents the extracted images in the memory device, and replacing the extracted images in the selection of media content with a metadata link that points to the single image. Similar images are generally those images that have no substantial differences apparent to human perception. What is considered similar may therefore vary depending on circumstances, for example, on the intended display medium, the desired quality of the final product, or the powers of perception ascribed to the intended audience.

In other, more detailed features of the invention, the images are selected from the group consisting of film frames, regions of interest in film frames, video fields, and regions of interest in video fields. Also, the selection of media content can be selected from the group consisting of a film take and a video program, in addition, the metadata link can include information that describes the extracted images. Furthermore, the metadata link can be preserved through an image operation, which can be selected from the group consisting of scaling, cropping, resizing, and color correction.

In other, more detailed features of the invention, the extracted images can be reinserted into the selection of media content by traversing the metadata link. Also, the images and the metadata link, which are included in the selection of media content, need not be subjected to a lossy compression technique, in addition, the method can further include using the extracted images as a thumbnail.

In other, more detailed features of the invention, the images include a first image and a second image, and the step of using the image-matching algorithm to identify images that are similar in the selection of the media content includes calculating a first gray-scale distribution of a red channel for each of the first image and the second image, and calculating a first mean, a first medium, and a first standard deviation for each of the first gray-scale distributions. Also, the method includes calculating a second gray-scale distribution of a green channel for each of the first image and the second image, and calculating a second mean, a second medium, and a second standard deviation for each of the second gray-scale distributions. In addition, the method includes calculating a third gray-scale distribution of a blue channel for each of the first image and the second image, and calculating a third mean, a third medium, and a third standard deviation for each of the third gray-scale distributions.

Furthermore, the method includes calculating a first percentage difference between the first means for the first and second images, calculating a second percentage difference between the second means for the first and second images, calculating a third percentage difference between the third means for the first and second images, calculating a fourth percentage difference between the first mediums for the first and second images, calculating a fifth percentage difference between the second mediums for the first and second images, calculating a sixth percentage difference between the third mediums for the first and second images, calculating a seventh percentage difference between the first standard deviations for the first and second images, calculating an eighth percentage difference between the second standard deviations for the first and second images, and calculating a ninth percentage difference between the third standard deviations for the first and second images, and classifying the first image and the second image as being similar when all of the first, second, third, fourth, fifth, sixth, seventh, eighth, and ninth percentage differences are less than a threshold value, which can be two percent.

An exemplary embodiment of the present invention is an apparatus that includes a computer having a first computer-readable medium and a second computer-readable medium. The first computer-readable medium is configured to store a program that implements an image-matching algorithm. The second computer-readable medium is configured to store images that are included in a selection of media content. The computer is configured to execute the program, and the program, once executed, prompts the computer to identify images that are similar in the selection of media content, to extract the images that are similar from the selection of media content, to store a single image that represents the extracted images in the second computer-readable medium, and to replace the extracted images in the selection of media content with a metadata link that points to the single image and that includes information describing the extracted images. In other, more detailed features of the invention, a hierarchical storage management system is coupled to the computer and configured to store the extracted images.

Another exemplary method according to the invention is a method for editing a video program. The method includes providing a previously edited video program that originally was created from film footage (wherein the previously edited video program includes video fields and the film footage includes film frames), determining which of the video fields from the previously edited video program includes a unique film frame, and extracting the video fields from the previously edited video program that include a unique film frame.

In other, more detailed features of the invention, an algorithm is used to implement the step of determining which of the video fields from the previously edited video program includes a unique film frame. The algorithm can be selected from the group consisting of a DC-average algorithm, a histogram algorithm, a thumbnail algorithm, a low-fez algorithm, a macroblock-average algorithm, a full-frame algorithm, a high-rez algorithm, a wavelet-coefficients algorithm, an edge-matching algorithm, a level-map algorithm, a feature-classification and object-tracking algorithm, a temporal object-matching algorithm, a scale-invariant feature-identification algorithm, an expert learning system algorithm, and an artificial-intelligence algorithm.

In other, more detailed features of the invention, the method further includes collecting cadence information regarding the video fields from the previously edited video program. The step of collecting cadence information regarding the video fields from: the previously edited video program can include determining how long each film frame was displayed in the previously edited video program.

In other, more detailed features of the invention, the method further includes determining the speed shift of the original transfer of the film footage to the previously edited video program. The step of determining the speed shift of the original transfer of the film footage to the previously edited video program can include creating a timeline that shows what a film-transfer speed was on a given scene in the previously edited video program.

In other, more detailed features of the invention, the method includes creating another versions of the previously edited video program by using the extracted video fields, the cadence information, and the speed shift. Also, if the previously edited video program was created from the film footage using a variable-speed method, then the method can further include creating an intermediate film frame that corresponds to a moment in time that was not captured in the film footage.

In addition, the method can further include applying motion blur to the intermediate film frame.

Another exemplary embodiment of the present invention is an apparatus including a computer having a computer-readable medium that is configured to store a program. The program is configured to analyze a previously edited video program that originally was created from film footage. The previously edited video program includes video fields and the film footage includes film frames. The computer is configured to execute the program, and the program, once executed, prompts the computer to determine which of the video fields from the previously edited video program includes a unique film frame, and to extract the video fields from the previously edited video program that include a unique film frame.

Another exemplary method according to the invention is a method for editing video program. The method includes providing a previously edited video program that originally was created from film footage, wherein the previously edited video program includes video fields and the film footage includes film frames. The method also includes providing an image-matching algorithm and a memory device, using the image-matching algorithm to identify video fields that are similar in the previously edited video program, and extracting the video fields that are similar from the previously edited video program. The method also includes storing a single video field that represents the extracted video fields in the memory device, replacing the extracted video fields in the previously edited video program with a metadata link that points to the single video field, determining which of the video fields from the previously edited video program include a unique film frame, and extracting the video fields from the previously edited video program that include a unique film frame.

Other features of the invention should become apparent from the following description of the preferred embodiments taken in conjunction with the accompanying drawings, which illustrate, by way of example, the principles of the invention.

BRIEF DESCRIPTION OF THE DRAWINGS

FIG. 6 is a table showing a portion of a timeline describing a standard 2:3-sequence of film frames.

FIG. 7 is a table showing a portion of a timeline of film frames whose speed has been modified using a variable-speed process, FIG. 8 is a fable showing an example of a timeline of film frames with shot change and speed information included.

DETAILED DESCRIPTION OF THE PREFERRED EMBODIMENTS

Figure 3:
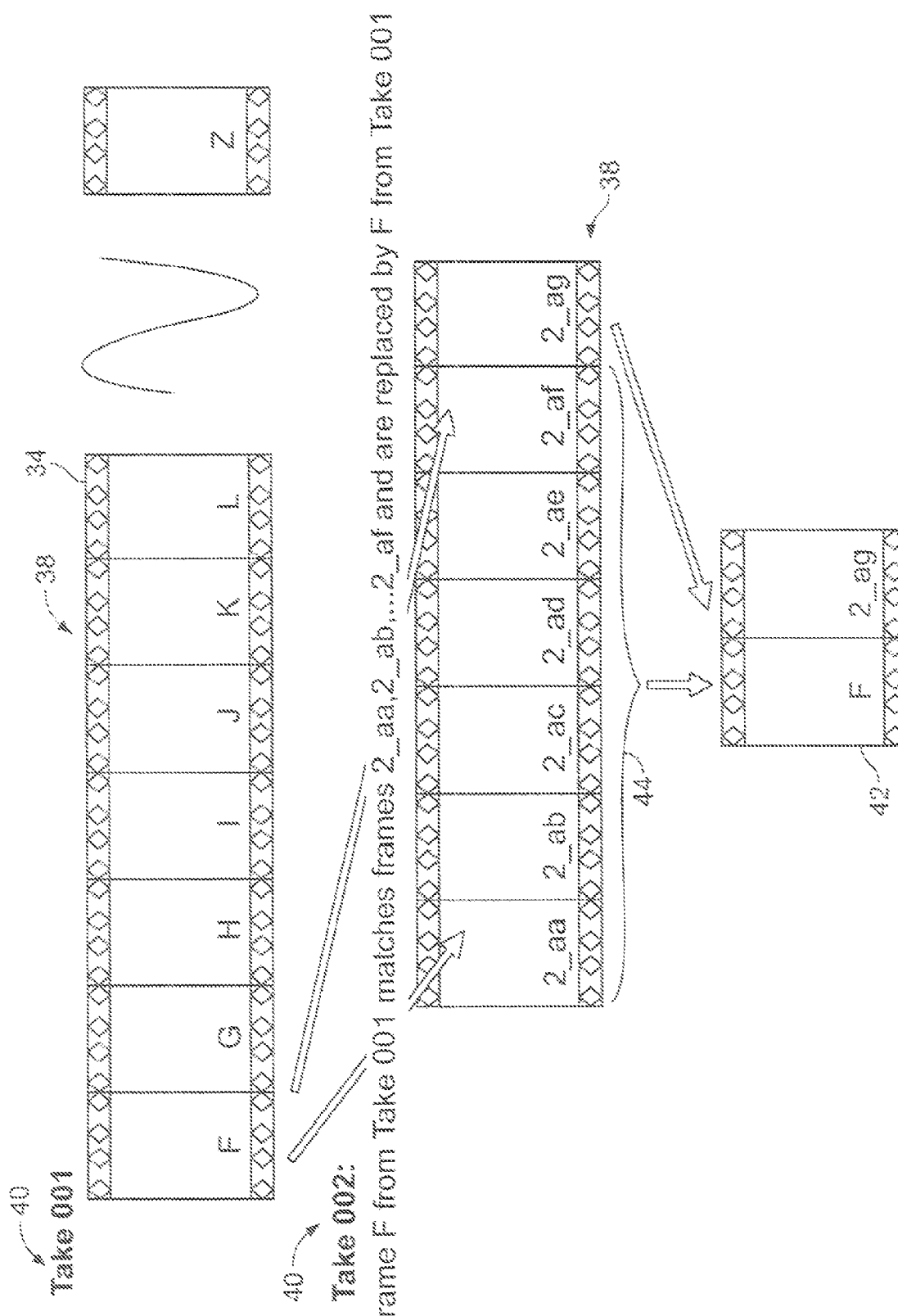
FIG. 3 is a schematic representation of how an entire group of film frame takes can he grouped together according to the present invention.

Referring to FIG. 3, by utilizing an efficient image-matching algorithm, it is possible to identify dissimilar and similar film frames 38 across multiple takes 40. Similar film frames can then be collapsed into a single film frame 42, and the redundant film frames 44 can be replaced with metadata links that point to the single "parent" film frame and, if desired, also to the take. For example, if four film frames numbered 123456.dpx, 123488.dpx, 125618.dpx, and 128961.dpx are found to be similar, three of the film frames can be replaced with metadata links that point back to the "parent" film frame numbered 123456.dpx. A directory listing for this example is the following:

| | | | |
|---|---|---|---|
| -rw-r--r-- | 1 paulklam | paulklam | 12M Jan 23 16:45 123455.dpx |
| -rw-r--r-- | 1 paulklam | paulklam | 12M Jan 23 16:45 123456.dpx |
| -rw-r--r-- | 1 paulklam | paulklam | 12M Jan 23 16:45 123457.dpx |
| ... | | | |
| -rw-r--r-- | 1 paulklam | paulklam | 12M Jan 23 16:45 123487.dpx |
| lrwxr-xr-x | 1 paulklam | paulklam | 19 Feb 13 18:10 123488.dpx -> 123456.dpx |
| -rw-r--r-- | 1 paulklam | paulklam | 12M Jan 23 16:45 123489.dpx |
| ... | | | |
| -rw-r--r-- | 1 paulklam | paulklam | 12M Jan 23 16:45 125617.dpx |
| lrwxr-xr-x | 1 paulklam | paulklam | 19 Feb 13 18:10 125618.dpx -> 123456.dpx |
| -rw-r--r-- | 1 paulklam | paulklam | 12M Jan 23 16:45 125619.dpx |
| ... | | | |
| -rw-r--r-- | 1 paulklam | paulklam | 12M Jan 23 16:45 128960.dpx |
| lrwxr-xr-x | 1 paulklam | paulklam | 19 Feb 13 18:10 128961.dpx -> 123456.dpx |
| -rw-r--r-- | 1 paulklam | paulklam | 12M Jan 23 16:45 128962.dpx |

The above directory listing shows the replacement of the three film frames numbered 123488.dpx, 125618.dpx, and 128961.dpx, each of which is 12 MB in size, with metadata links, each of which is merely 19 bytes, and which point to the "parent" film frame numbered 123456.dpx. FIG. 3 schematically illustrates the grouping together of frames and takes in accordance with a preferred embodiment of the present invention.

Figure 4:
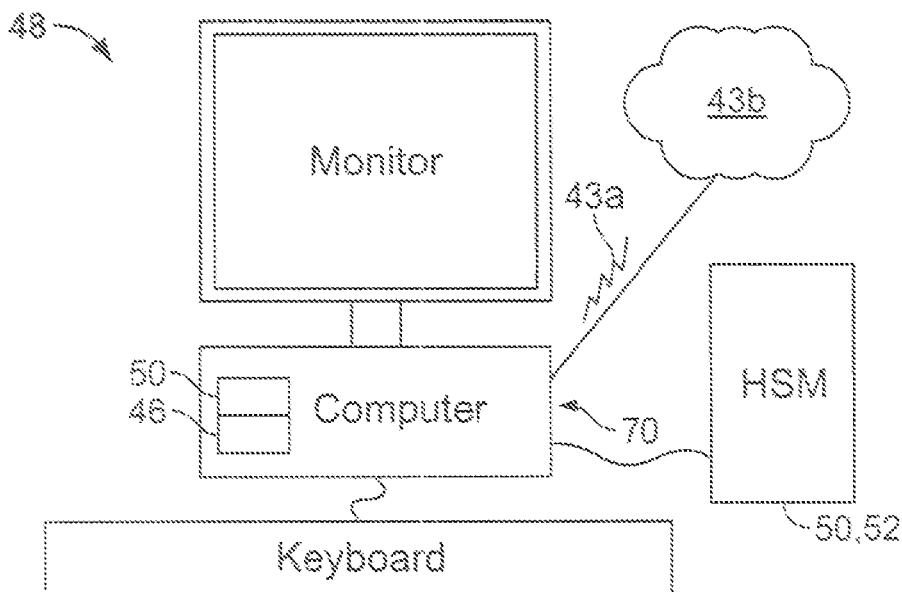
FIG. 4 is a simplified diagram illustrating a computer, which is configured to be used during data compression and editing according to the present invention.

Referring additionally to FIG. 4, the image-matching algorithm can be implemented using a computer program, which can be stored in a computer-readable medium 46, i.e., a computer memory device, for example, a random access memory ("RAY"), a read-only memory ("ROM"), a Flash memory, a magnetic or optical disk drive, an a magnetic tape drive, in a computer 48. The film frames 38 that are analyzed using the image-matching algorithm can be stored in the computer in the previously mentioned computer-readable medium/memory device or another computer-readable medium/memory device 50 included in the computer, or coupled to the computer, in addition, compressed media content prepared according to the invention may be stored on a computer-readable medium on any suitable article 50, for example, on a magnetic medium as on a computer hard drive or digital video tape, or on an optical medium as in a DVD disk or the like. Compressed media content may likewise be transmitted via a carrier signal 43a, for example, using an Internet Protocol (IP) signal, to any remote destination connected via a wide area network 43b to computer 48.

This metadata link is preserved through any image operations (e.g., scaling, cropping, and resizing) and also through color corrections. Additionally, if desired, using an intelligent post-rendering system, the imaging operations also can be applied to the other takes 40 as a background process. In this fashion, the undesired takes are also ready to be "cut-in" when they suddenly become the selected take.

For asset-tracking purposes, the take 40 is presented as an asset with all the film frames 38; however, internally, the duplicated data (i.e., similar film frame data) is discarded. Archiving is carried out in a similar fashion. During data retrieval, the metadata link can be traversed, i.e., selected, and the "discarded" film frame 44 can be brought back from the "parent" 42. This is easily accomplished using the same metadata link or even a hierarchical storage management ("HSM") system 52, which can be coupled to the computer 48, as shown in FIG. 4.

This mechanism permits the user to scan ail the takes 40 for a given production on a full-bandwidth scanner while maintaining current storage and data-access projections. Furthermore, by employing an efficient image-matching algorithm or algorithms, it is possible to discard duplicate film frames 44 that occur on successive takes, without employing lossy compression, i.e., a data compression technique that result in some amount of lost data. Preferably, the duplicate film frames, or relevant portions of the duplicate film frames, are discarded non-destructively, by moving them to another storage location 52 (e.g., tape, optical disk or other storage device) comprising a computer-readable storage medium. By discarding similar film frames, the number of film frames 38 that have to be searched through, color corrected, sized, rendered, or otherwise modified or edited, archived, stored, and then subsequently backed up to tape is substantially reduced, To preserve the take 40 from which the film frames 44 have been discarded, a linking scheme with embedded metadata, describing the film frame, is employed. Additionally, this metadata will be transferred to the asset management and production tracking system, fagging the different takes that are affected by this change. A fagging process may utilize the metadata and other information (date, production, lab roll, camroll, scene, take, or other category of information) and uniquely tag each frame in a database. This database may be implemented in a number of ways, i.e., simple text file, an SQL database, or other database format. Tagging also permits the database to maintain the relationship each frame has with other frames around it, so that by accessing one frame of the sequence it is possible to determine the entire lineage of the sequence, including identification and characterization of each frame in the sequence, including any historical details about the sequence or each frame in it. In an embodiment of the invention the tagging process occurs at the same time as image-matching process, notating in a searchable database of information such as the scene/take, labroll, camroll, production, reel, date, path, height and width of that frame. This permits a quick reference of that frame without having to traverse all the frames in the sequences. Likewise, spatial changes, color corrections, or other alterations that have been applied to each frame may be identified and recorded during the tagging process.

Tagging is done for a variety of reasons. First, in the case of an ongoing production, any changes with respect to cropping, resizing, and scaling, as well as any color corrections, do not have to be applied more than once. Additionally, an intelligent background rendering process can apply the changes being effected to a particular take 40 to the other takes that share cross-linked film frames 38. In this manner, the other takes are available on-demand, and do not have to be "rendered" before display, but rather when they are called upon. Second, from the production tracking standpoint, these duplicate frames 44 can be used as thumbnails to uniquely identify and track this set of takes, visually, rather than using obscure take numbers such as 4GB/A, 4XD/2. Finally, an entire set of takes can now be grouped together and, with proper interface to an HSM system 52, can be moved into and out of online and near-line storage (or in the case of Videos, fast and slow storage).

The image-matching algorithm described above can also be applied on the lower-resolution proxies, which are used for all subsequent operations after scanning (in the 4k scanning case). The lower-resolution proxies are sub-sampled copies of an original image. For example, if the original image includes 2048 horizontal pixels by 1556 vertical pixels, then a half-resolution ("half-rez") proxy could be 1024×778 pixels and a quarter-rez proxy 512×389. These proxies are routinely generated on a group of utility computers using a variety of filters and algorithms, it is expected that a higher degree of similarity between like film frames 38 will occur at lower resolutions, as the dissimilarity caused by the grain will be reduced.

During the archiving stage, either the metadata link can be maintained or the film frame(s) 44 can be brought back and archived. An advantage of maintaining the archive with similar film frames is that the user is not dependent on the HSM system 52 or the image-matching algorithms to un-archive the data set at a later date.

To determine the similarity of film frames 38 across takes 40, a two-step process can be employed. First, a visual check across takes can be made to identify portions of the takes that appear similar. These include static shots and shots with movement. Second, the film frames that appear visually similar are extracted, and the gray-scale distribution of the image is computed in each of the red, green, and blue channels. From the histograms for each of the red, green, and blue channels, the mean, the median, and the standard deviation are then computed.

Empirically, it has been found that if the mean, the median, and the standard deviation for each of the gray-scale distributions (one for the red channel, one for the green channel, and one for the blue channel) of the film frames 38 that are compared are within 2%, the film frames appear almost identical. Accordingly, a less than 2% difference in each of the mean, the median, and the standard deviation may be determined to be the threshold for determining if two film frames are sufficiently similar to justify considering them duplicate film frames 44. Depending on the application and the precision desired, larger or smaller differences in the mean, the median, and/or the standard deviation also can be used.

Figures 1, 2:
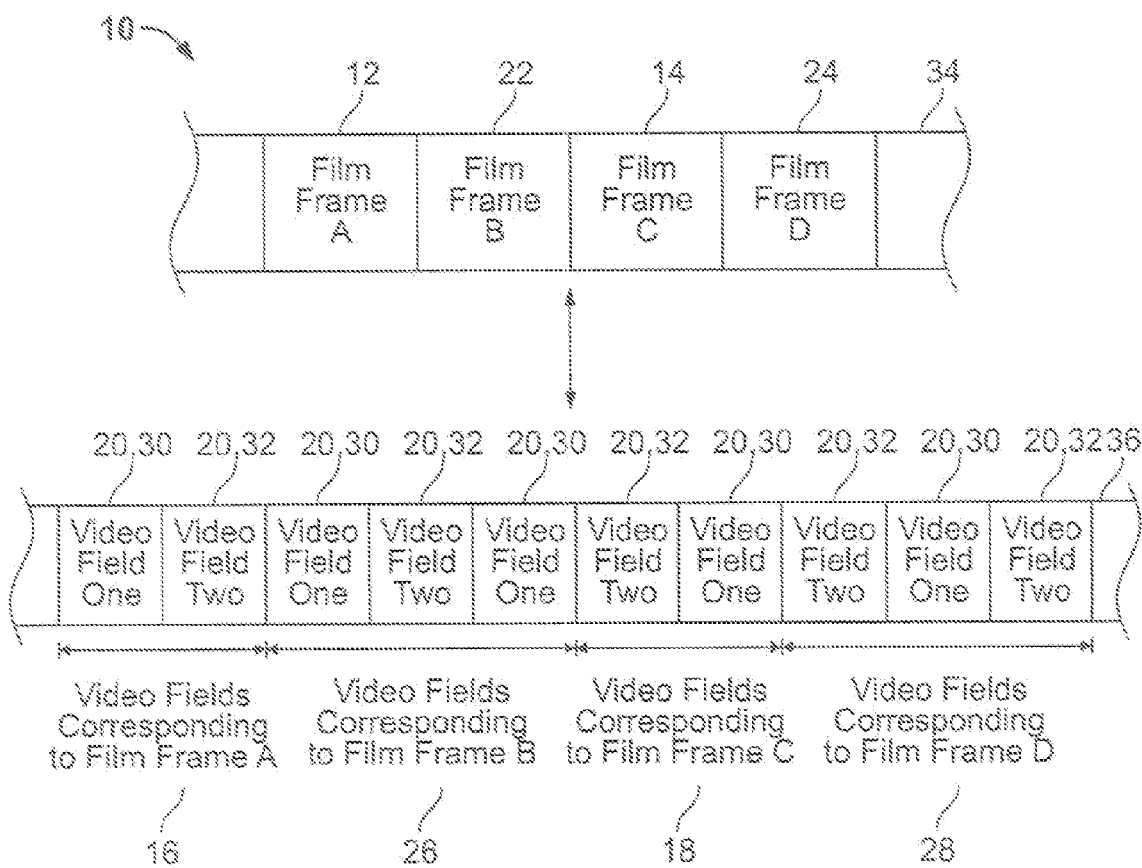
FIG. 1 is a table showing a four-field sequence of film frames A-D having a standard 2:3 sequence of film frames.
FIG. 2 is a schematic representation of a transformation of the film frames from FIG. 1 into video fields.

Referring additionally to FIGS. 1 and 2, while the previous discussion has focused on images in the form of film frames 38 included in takes 40, it should be appreciated that the present invention can be applied to other images, for example, regions of interest within film frames, video fields 20, and regions of interest in video fields. The video fields can be included with a video program 36.

Using the above procedure as a starting point, a quick analysis of a television show and a cartoon program were carried out. Dallies for each of the shows were scanned on a THOMSON SHADOW Scanner (1920×1080) and were saved onto QUBITS, using QUVIS's proprietary compression scheme at a PSNR of 54 dB. The television program spanned seventeen drive volumes, totaling over five TB, and was maintained as QUBIT compressed flies. The cartoon program spanned six volumes, totaling over two TB, and was maintained as QUBIT compressed riles. Using the above-described method of discarding similar video fields 20, the television program was reduced/compressed by an estimated ratio of 25:1. This could be due, at least in part, to the fact that there were numerous static shots; including long shots that presented the same camera move and multiple retakes that were very similar. By discarding similar video fields, the cartoon program was reduced/compressed by a ratio of 10:1.

Figure 5:
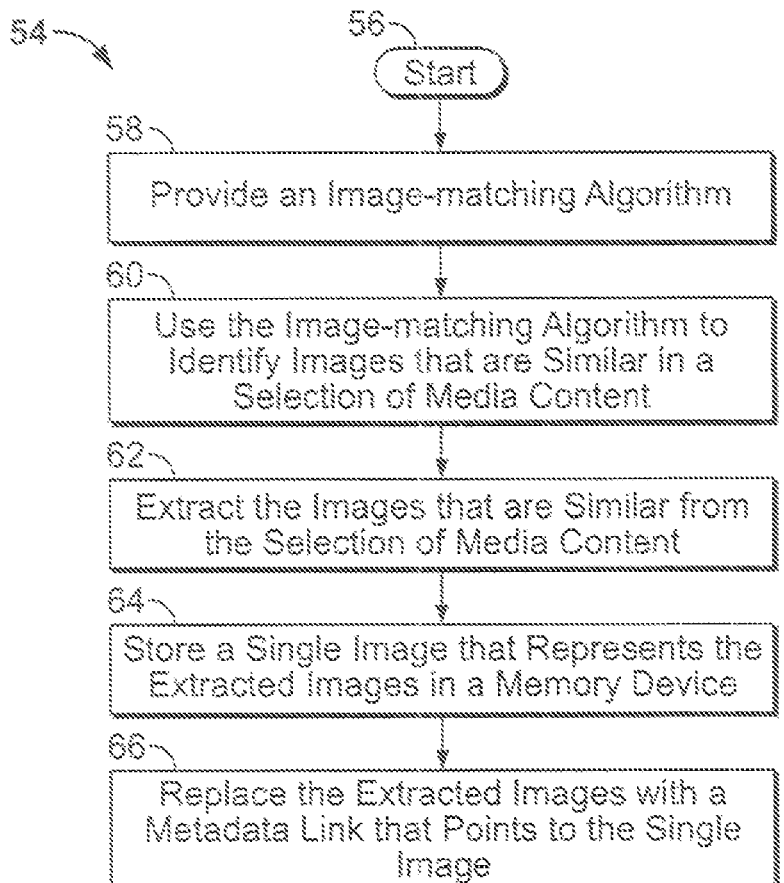
FIG. 5 is a flowchart of a method for data compression according to the present invention.

FIG. 5 is a flowchart that includes various steps of the present invention's data compression method 64. The data compression method starts at step 56. Next, at step 58, an image-matching algorithm is provided, and used, at step 60, to identify images (e.g., film frames 38 and video fields 20) that are similar within a selection of media content (e.g., a film take 40 and a video program 36). At step 62, images that are identified as being, similar are extracted from the selection of the media content. Next, at step 64, a single image 42 that represents the extracted images is stored in a memory device 46 and 50. At step 66, the extracted images are replaced in the selection of media content with a metadata link that points to the single image that is stored in the memory device. Finally, the data compression method ends at step 68. The data compression method according to the present invention can include additional steps, as discussed in greater detail in this document.

The method of discarding similar film frames 44 described above has numerous applications. For example, using method and apparatus described herein, an entire feature can be scanned, and only dissimilar film frames 38 can be maintained online for different cuts. This reduces storage requirements and allows for the archival of all of the shot footage at the same time. Using the notion of similar film frames across takes 40, the method described above can be used to provide a quick and easy mechanism for organizing takes within a production. Then, the production tracking/asset management system would need only to present these new subsets of frames for cataloguing the collection of takes. Additionally, the method above can be modified to operate on regions of interest within film frames, determine motion vectors, and/or allow feature tracking, if the image-matching program is modified to operate at least partially in regions of interest, rather than the entire film frame, only the region of interest needs to be saved, saving even more space. Alternatively, if the image-matching program operates and determines motion vectors and allows feature tracking, then only key frames need to be saved and intermediate frames can be constructed from the delta information of the motion vectors and feature tracking.

Another aspect of the present invention is the separation of unique film frames 38 from a video program 36 that was create from film footage 34. Thus, one important aspect of the method and apparatus for separating unique film frames according to the present invention is that it should accurately determine which video fields 20 comprise which unique film frames. If the unique film frames are not accurately determined, none of the subsequent processes will be correct. As a result, the ability to accurately determine the unique film frames or related data is an important aspect of the present invention. Another important attribute or advantage of any system for separating unique film frames, is its ability to function with minimal human intervention. Because there are 108,000 fields in a 30-minute video program, it is impractical, time consuming, and very expensive to require a human to interact with even a small portion of those video fields. It is highly desirable to have a computers central processing unit ("CPU") 70 analyze and process each video field, because regardless of how long a CPU takes to do so, the algorithm can always be implemented across multiple CPUs to reduce the amount of time it takes to analyze and process each video field.

The following example illustrates the level of accuracy needed when determining which film frames 38 or related data are unique. If the accuracy of detecting unique film frames is 90.999%, a very good number by most accounts, then 1.08 failures can be expected every 30 minutes. This accuracy rate is not acceptable to the motion picture industry. Typically, no single algorithm can provide an accuracy rate of 99.999% (an error rate that is better than one/one-thousandth of a percent). Accordingly, an algorithm should not be used unless it can provide better than a 99.999% level of accuracy. Instead, in a preferred embodiment of the present invention, a sieve of progressively tougher detection algorithms is employed, to improve the accuracy rate to a target value of 99.99999% (one/one-hundred thousandth of a percent error rate). With this level of accuracy, typically, only a single mistake would occur every 46.3 hours (i.e., approximately three mistakes in a week). This would likely be an acceptable level of accuracy rate for the motion picture industry.

Typically, video material 36 is analyzed based on four criteria; 1) level (overall brightness) or histogrammatical (the numerical values of that brightness), 2) spatial (the numerical values mapped to an x-y grid), 3) temporal (changes in the images over time), and 4) spectral (the intensity of the energy in the various bands of frequency). Additionally, hybrid schemes using a combination of two or more of the above criteria also can be used. To achieve the previously stated 99.99999% accuracy rate, all of these criteria likely will need to be employed. Examples of the algorithms that can be utilized in accordance with the present invention include, but are not limited to the algorithms discussed in the paragraphs below. Suitable variations on these and other suitable comparison algorithms should be apparent to one of ordinary skill, after reviewing the instant disclosure.

DC-average algorithm: This operates by computing the dc average of all of the pixels of a video field 20. The DC-average algorithm reduces a 400,000 pixel field to one byte if the video field is monochromatic, or three bytes if the video field is color.

Histogram algorithm: A statistical analysis of the number of pixels in a video field 20 having a particular value. The histogram algorithm results in more information than the dc-average algorithm without conveying any spatial information. The algorithm obtains a representation of the image by counting the 'color' of each pixel. This statistical analysis determines the number of occurrences of a particular 'color' within the image, permitting better discernability from other frames. The histogram algorithm reduces a 400,000 pixel field to just 8 bytes (8 bit image), or 10 bytes (10 bit image) or 16 bytes (16 bit image).

Thumbnail algorithm or low-rez algorithm: The thumbnail algorithm and the low-rez algorithm provide some spatial information, yet they provide much less spatial information than algorithms that are performed using full-image resolution. The thumbnail image that is used for the thumbnail algorithm or the low-rez algorithm can be either the entire image 20 scaled down in size or a crop of a central portion of the image. This algorithm generates a lower resolution image of the original image, using any suitable method as known in the art. A lower-resolution representation of the image is created by spatially filtering the original high resolution image into a much smaller size, while maintaining discernability from other frames. A suitable low-rez/thumbnail algorithm, for example, may reduce a 400,000 pixel field to just 4000 pixels. In an embodiment of the invention, a simple box-filter may be used to reduce the original high resolution image, in the box-filter algorithm, a virtual box (kernel) is placed over 4 pixels in the original high resolution image, and the resulting pixel would have the numerical mean of the 4 pixels, resulting in a 4:1 reduction in size. In the alternative, the size of the kernel (virtual box) may be any suitable number of pixels, or the new pixel's value may be computed in any suitable alternative way.

Macroblock-average algorithm: Depending on the size of the macroblock this can provide a little to a lot of spatial information. A video image is typically separated into one luminance (Y) and two chrominance channels. Blocks of the luminance and chrominance arrays are organized into "macroblocks," which are the basic unit of coding within a picture. Each macroblock is divided into four 8 8 luminance blocks. The number of 8 8 chrominance blocks per macroblock depends on the chrominance format of the source image. For example, in the common 4:2:0 format, there is one chrominance block per macroblock for each of the two chrominance channels, making a total of six blocks per macroblock. In one "embodiment" of the invention a macroblock size would be 8×8. The algorithm may operate by averaging values over each macroblock.

Full-frame algorithm or high-rez algorithm: A suitable full-frame matching algorithm may operate by extracting each pixel's information (e.g., horizontal and vertical location and color) and the information of all the neighboring pixels. In an embodiment of the invention, the full-frame algorithm may take the information for each pixel from one image, and compare it with every single pixel in another image. Based on this comparison (i.e location in x&y and color) the level of match between these two frames can be assessed. E.g, if 2 frames, have the same pixel (100,200,100) (numbers represent pixel values in red, green and blue) at location (1250,32), then we can assign a match coefficient of 1 to that pixel. Conversely if one frame has at location (1250, 32) a pixel of value (200, 100, 100) and the other has a pixel of value (100,200, 100), then the match coefficient would only be 0.333. This match coefficient, or any other value suitable for comparing the information for corresponding pixels, may he computed over every single pixel, or a selected portion of the pixels, to determine the overall match coefficient for the 2 frames.

Wavelet-coefficients algorithm: The wavelet-coefficients algorithm divides the frequency band of the image into layers, to facilitate hierarchical comparisons. Wavelets are mathematical functions that cut up data into different frequency components, and then study each component with a resolution matched to its scale. They have advantages over traditional Fourier methods in analyzing physical situations where the signal contains discontinuities and sharp spikes. The wavelet analysis procedure adepts a wavelet prototype function, called an analyzing wavelet or mother wavelet. As this mother wavelet can be represented in terms of a series of wavelets (using coefficients in a linear combination of the wavelet functions), data operations can be performed using just the corresponding wavelet coefficients. The wavelet coefficients are extracted by carrying out frequency analysis of the image across its various frequency bands. The image can now be represented as these wavelet coefficients (400,000 pixel field is now a dozen wavelets), and these wavelets are compared against each other to find matching (or similar) frames.

Edge-matching algorithm: The edge-matching algorithm compares the edges of image features, and can include a size and position search. The edge-matching algorithm extracts edge information from the image. In one implementation, edges are extracted by looking at variations between neighboring pixels. If two neighboring pixels differ by a certain amount (user-settable and automatically adaptable), then an edge is said to exist between these two pixels. These individual pixel edges are then connected with each other to generate an overall edge-map of a particular frame. At this point, rather than looking at the overall image, a matching functions matches the edge-map between frames to determine how close (similar) they are to each other.

Level-map algorithm: The level-map algorithm segments an image 20 info bands of quantization levels, counts the number of features in each quantization layer, and compares it to a source. The level-map algorithm is similar to the histogram algorithm, but the level-map algorithm includes spatial information.

Feature-classification and object-tracking algorithm: The feature-classification and object-tracking algorithm identifies individual objects within an image 20 (e.g., a red automobile) and searches for other images with similar objects.

Temporal object-matching algorithm: The temporal object-matching algorithm is similar to the feature-classification and object-tracking algorithm, but with the added ability to look across a range of images 20 (time) to find when one object is in the same spatial relationship with another.

Feature-identification algorithm: The scale-invariant feature-identification algorithm is similar to the feature-classification and object-tracking algorithm, but the scale-invariant feature-identification algorithm works regardless of the absolute size and position of the objects, and keeps in mind the relative size and positions of the objects.

Expert learning system, algorithm and artificial-intelligence algorithm: This technique utilizes a computer algorithm that compares its results with those of a human operator who is correcting its mistakes. The computer algorithm stores the difference and the context in which the difference was generated, and uses that information to increase efficiency in the future. The expert learning system algorithm and the artificial intelligence algorithm, in combination, should offer excellent potential for achieving superior accuracy rates.

Referring additionally to FIG. 6, after the unique film frames 38 have been identified, a timeline 72 is created to show what the film-transfer speed is on any given scene. This will be a list of each film frame and how long it is displayed in the source video material 36. Additionally, keycode 76, scene, take 78, and other ancillary data can be contained in this list. FIG. 6 shows a portion of a hypothetical timeline describing a standard 2:3 sequence. FIG. 7 shows a portion of a timeline 80 of film frames whose speed has been modified using a variable-speed process.

Since the field rate of the source video material is a fixed 59.94 fields/second, the value of duration in the list 72 and 80 is always a multiple of the field rate, or 16.68333 ms for National Television System Committee ("NTSC") standards. This is a very coarse temporal sampling, which will require many frames to find an average frame rate for a particular scene. In the example in FIG. 7, six film frames 38 are shown in fourteen video fields 20. Each of the six film frames is shown for an average of 38.9278 ms, for a frame rate of 25.69 frames/second. If, however, frame seven, which is not shown on the table of FIG. 7, is shown for two fields (33.37 ms), then the new average becomes 26.22 frames/second, if frame seven is a shown for three fields (50.05 ms), then the frame rate becomes 24.68 frames/second. This demonstrates how the addition of one field can make a substantial difference in the frame rate. The difference one additional frame can make in frame rate demonstrates the importance of averaging the frame rate over many frames.

The source of most variable-speed program material is the telecine process, which cannot change speeds on a frame-by-frame basis. The telecine process adds additional fields 20 to a motion picture 34 to increase its frame rate from 24.00 frames/second to the NTSC standard of 59.94 fields/second. It is fortunate that the telecine cannot change speeds on a frame-by-frame basis because, it means that within a particular shot, the speed will remain constant. FIG. 8 shows an example of a timeline list 82 with shot change 84 and speed 86 information included. A shot-change detector can be used to increment the shot number as well as to calculate a new speed value by determining the number of video fields in the shot ("Tvideo") (each video field is 16.67 ms in duration) and the number of unique film frames 38 in the shot ("Tfilm") (each film frame is 41.67 ms in duration), and then, dividing the total film time (Tfilm*41.67 ms) by the total video time (Tvideo* 16.67 ms). Of course, in most situations, the keycode 76, scene 74, and take 78 information shown in FIG. 8 will not be available.

After the field sequence has been determined for a particular shot 84, the video fields 20 can be recombined to form the original film frame 38, and used directly if they are in the proper resolution and format. Alternately, the recombined video fields can be used to find the original film frames from a database of source clip image files. In the latter case, the image files can be stored and used at any resolution or format and therefore can be used along with the timeline 72, 80, and 82 to reconstruct the video program 36 in new resolutions and formats.

The post-production process used in video programs 36 has changed greatly over the years. Some of the techniques and equipment employed on video programs and other programming can cause huge problems for various image search algorithms. Examples of issues that create problems for image search algorithms are provided in the paragraphs below.

Non-standard sizing and position: Older telecines had notoriously poor vertical image stability. To prevent the frame line from creeping into the image at the top or bottom while it was being transferred, the common practice of the time was to zoom in (enlarge) on the image. Because of this practice, most older television shows are blown up far more than would have been if they were created today. The sizing difference also makes pixel-by-pixel comparisons between images inaccurate.

Shading: Older telecines had a circuit that modified the transfer characteristics (levels) of the image based on spatial location. The top-left portion of the image may have been lower contrast than the lower-left portion of the image, which may have been darker than the far right. This shading was done on ail three colors and the circuitry employed was notoriously susceptible to thermal drift. This instability makes low-frequency or thumbnail comparisons inaccurate.

Noise: Older telecines were 5 db to 10 db noisier than current telecines. This random high-frequency noise makes comparisons of higher-frequency image content inaccurate.

Because the methods and processes discussed above cause various problems with separating unique film frames 38, it is obvious that typically more than one algorithm is needed overcome the differences between today's scanners and yesterdays telecines. Therefore, in accordance with the present invention, multiple algorithms can be employed in a hierarchical manner to get the highest accuracy in the least amount of time.

It should be appreciated that a balance must be struck between accuracy in determining unique film frames 38 and processing speed. The search for a few hundred frames out of a pool of hundreds of thousands of frames can be sped up by first scanning through all the frames with a low, false-negative algorithm with low CPU utilization. After the search is initially narrowed, a search of a few candidate scenes might be appropriate. At this point more computationally intensive algorithms can be employed to narrow the search further. If a conflict still remains, or the unique film frames are not correctly identified, a temporal comparison between sequences can be performed. Finally, if all else fails, a human operator can be called in to choose between a limited number of remaining frames.

By combining the field cadence and the timeline information with the new film frames 38, the video program 36 can be recreated in a new resolution in either 24 frames/second or 60 fields/second. If however, the original material was transferred using variable speed, only the 60 fields/second version directly can be recreated. Temporally re-quantizing the film frames, or creating or interpolating new intermediate film frames that correspond to moments in time when a film frame is not available, allows the scene to be temporally re-sampled, and to remove the 3:2 motion artifacts, while reproducing the variable speed of the original video program at potentially any frame rate.

Figure 9:
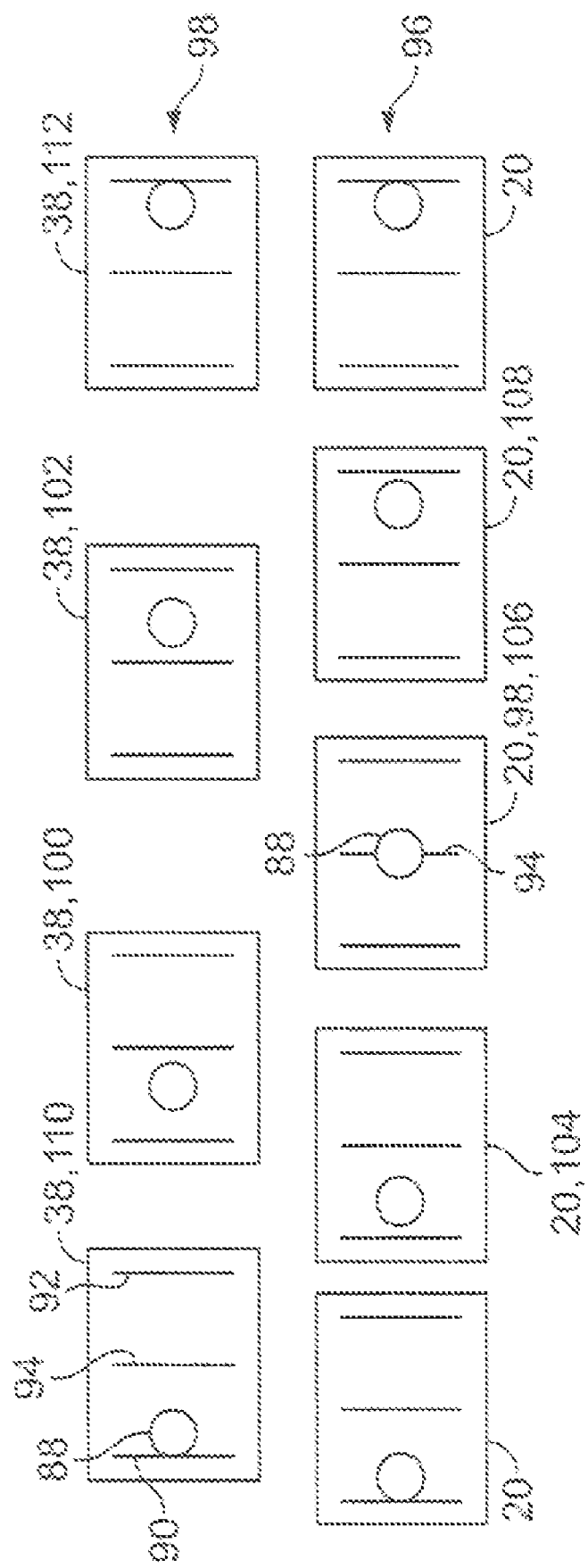
FIG. 9 is a schematic drawing that visually compares a scene with four film frames to the same scene with additional intermediate frames.

FIG. 9 illustrates the conversion of four film frames 38 to five video fields 20, without using the 3:2 field cadence, in FIG. 9, the four film frames at the top of the page depict a circle 88 moving from a line 90 at the left in the frames to a line 92 at the right. In the center, the circle passes another vertical line 94. It should be kept in mind that the shutter of the film camera is closed about half the time, so the gaps between the frames are, in a sense, accurate. Five video fields are needed to close these gaps and emulate a narrower shutter angle, which consequently also would show more motion blur. Also, the location of the circle would need to be recalculated for each frame, in the bottom row 96 of FIG. 9, five video fields are shown in their new temporal locations. In the middle field 98, the circle is directly aligned with the vertical line at the center. This can cause problems because in the original film frames, this did not occur. Therefore, it is impossible to determine from the original four film frames if the circle should be in front of the line at the center, or vice versa. This simple demonstration points out several important considerations about temporally re-quantizing the film frames.

As part of the temporal re-quantization process, first, the temporal gaps should be filled in and motion blur should be applied to minimize stroboscope "judder." Also, the shutter angle or exposure time should be emulated for the re-sampled timeline. Second, the moving object 88 should be rendered as a three-dimensional object that can pass in front of, or behind, other objects 94. Third, one frame 38 of the upper timeline 98 represents a 20.83 ms temporal slice, which changes by temporal re-quantizing (⅟₄₈th of a second, 24 frames/second with 50% duty cycle), while in the lower timeline 96 the same field represents 33.33 ms (⅟₃₀th of a second 100% duty cycle). Last, two frames 100 and 102 of the four source frames do not appear in the video output, and three 104-108 of the five output fields 20 are newly interpolated fields. Only the first and last frames 110 and 112, respectively, are unchanged in the output.

Figure 10:
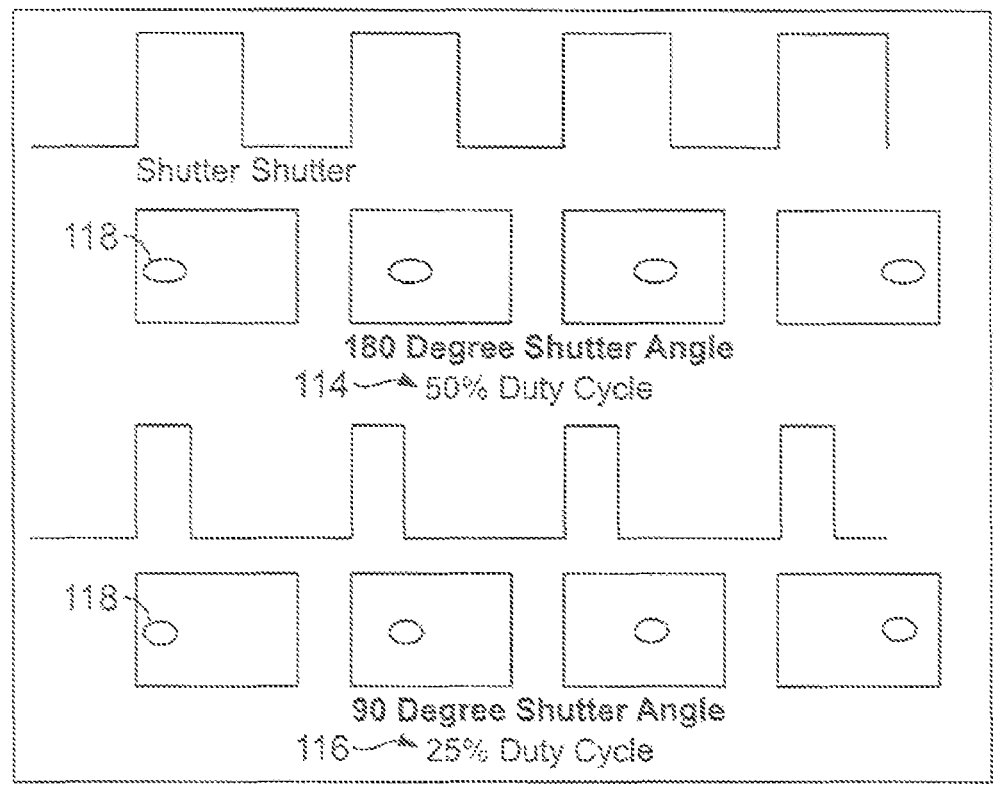
FIG. 10 is a schematic drawing that illustrates the effect of elongation on a ball when a 50% duty cycle with a 180-degree shutter angle is compared to a 25% duty cycle with a 90-degree shutter angle.

One can imagine motion pictures as a sequence of still images 38 shown in rapid succession. However, there are properties of each still image that are inherent in the manner and method of capture. The rate and duration of the temporal sample, which captured and froze the original scene, leave their mark on every frame of the sequence. Rate and duration would seem to be simple reciprocals of one another, but, while a high rate does imply a short duration, a low rate does not necessarily imply a long-duration sample. The relationship between rate and duration of the visual sampling period is expressed as duty cycle. FIG. 10 shows two different duty cycles 114 and 116 with the same sample rate of a moving ball 118. The ball is elongated in the direction of movement for both duty cycles, but due to the shutter being open longer with 180-degree shutter angle, the elongation is greater than in the 90-degree shutter angle.

Figure 11:
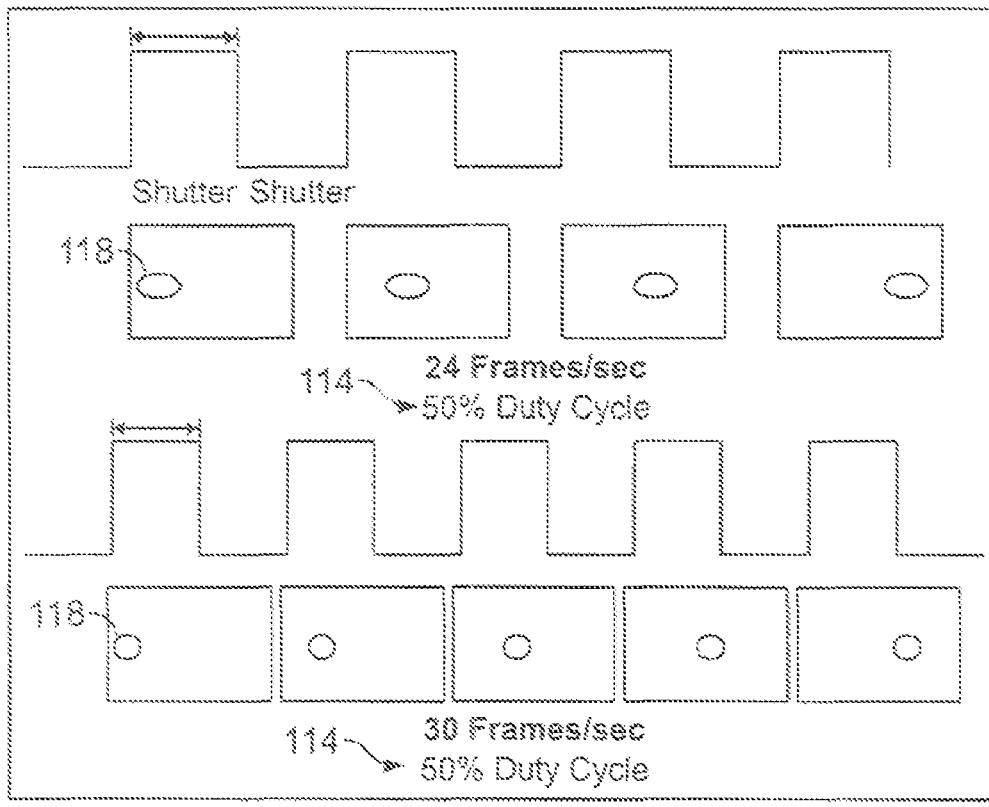
FIG. 11 is a schematic drawing that illustrates a moving ball temporally re-sampled from 24 fields/second to 30 fields/second while maintaining a 50% duty cycle.

In one embodiment of the present invention, film frames 38 are temporally extruded. Temporal extrusion involves mapping where each moving object is at any given time based on its location during the sample period in each film frame. Then, intermediate locations are calculated and the motion blur estimated for the new sample rate and duty cycle that are applied. FIG. 11 illustrates the same moving ball 118 that is shown in FIG. 10, temporally re-sampled from 24 fields/second to 30 fields/second, while maintaining a 50% duty cycle 114.

In yet another preferred embodiment of the present invention, temporal extrusion is performed by one or more of the following steps: 1) feature detection, 2) motion estimation, 3) motion blur estimation and de-convolution, 4) temporal re-quantization, and 5) motion blur convolution. As known in the art, frame images may be analyzed to detect specific image features, and in particular, features that are moving from frame to frame. The position of the identified features can be analyzed in a frame sequence to estimate the motion of each feature. Once an estimate for the motion is prepared, this can be used together with the optical parameters (e.g., sample rate and duty cycle) for the frame to estimate an amount of blur that should appear in each frame. The motion vectors from the steps and processes described above may be used to calculate the motion blur of the identified features from feature detection.

In addition, or in the alternative, to simulate shooting at a different frame rate, a deconvolution algorithm may be applied to the feature to estimate what the object would have looked like if no motion blur were present. This shows what the feature would look like if the taking camera had a very short exposure time.

The features now detected and de-convolved, the motion vectors and the de-convolved images may be taken and calculated where the features would have been if the camera shutter was open at the instant of the new, calculated, temporal sample, in a temporal requantization step. This can be done with vector algebra on a frame-by-frame basis. In this matter, new frames 38 and motion vectors are created at the desired resolution and frame rate.

The new motion vectors then are used to re-convolve the features to simulate the motion blur that would be present if the scene originally had been shot at the new frame rate with a user-selectable shutter angle. This user-selectable shutter angle is a new tool for post production. Up until now the only person who could change this parameter was the cinematographer at the time of the taking.

Figure 12:
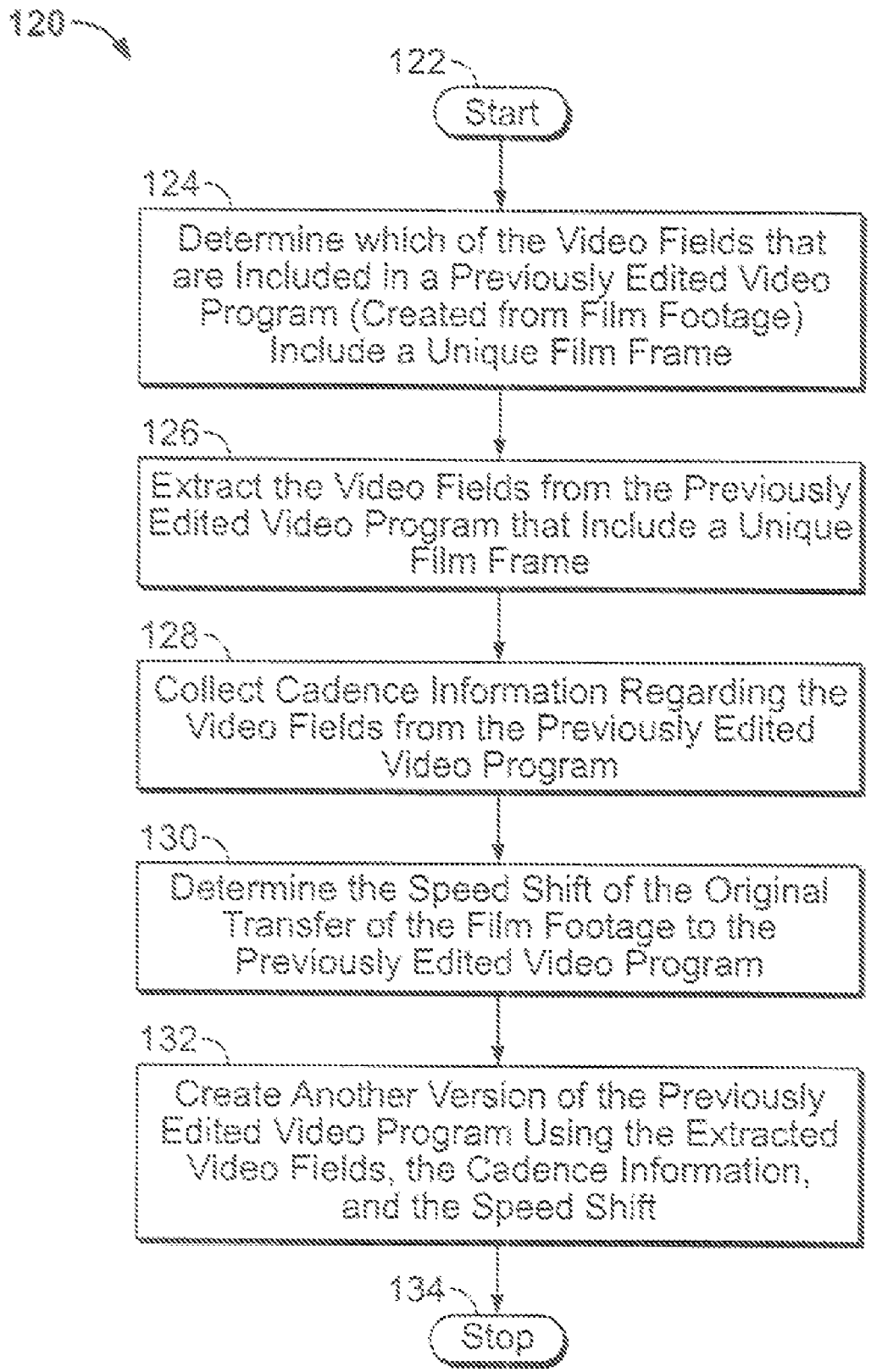
FIG. 12 is a flowchart of a method for editing media content according to the present invention.

The above method for editing a previously edited video program 36 is shown in the flowchart 120 included in FIG. 12. The flowchart starts at step 122, and is followed by step 124, where a determination is made as to which of the video fields 20 in the previously edited video program include a unique film frame 38. Next, at step 126, the video fields that include a unique film frame are extracted from the previously edited video program. At step 128, cadence information regarding the video fields is collected. Next, at step 130, the speed shift of the original transfer of the film footage 34 to the previously edited video program is determined. Finally, at step 132, a new version of the previously edited video program is created using the extracted video fields, the cadence information, and the speed shift. Then, the method ends at step 134.

The above method for editing a video program 36 can be implemented using a computer program that is stored in a computer-readable medium 46 and 50, which can be included in the computer 48 (FIG. 4). The steps of the method for editing a video program may be combined with the steps of the previously discussed method for data compression to form a single method.

It should be appreciated that the method and apparatus for providing lossless data compression and editing media content described herein allows unprecedented flexibility and control of legacy video and film programming and makes it possible to resurrect old television shows for future audiences at higher qualities and in different formats than have ever been seen before. A video program prepare according to the invention may be stored on a computer-readable medium on any suitable article 50, for example, on a magnetic medium as on a computer hard drive or digital video tape, or on an optical medium as in a DVD disk or the like, as shown in FIG. 4. A video program may likewise be transmitted via a carrier signal 43a, for example, using an Internet Protocol (IP) signal, to any remote destination connected via a wide area network 43b to computer 48.

It should also be appreciated that even though various embodiments of the present invention described above were directed to film frames 38 and video fields 20, the invention is not limited to such formats and can be applied to any type of suitable media. The foregoing detailed description of the present invention is provided for purposes of illustration, and it is not intended to be exhaustive or to limit the invention to the particular embodiments disclosed. The embodiments can provide different capabilities and benefits, depending on the configuration used to implement the key features of the invention. Accordingly, the scope of the invention is defined by the following claims.

What is claimed is:

1. A method for compressing a selection of media content comprising digital image data configured in image sequences to provide moving video output, the method comprising:

using at least one computer to perform the steps of:

extracting similar images from a selection of media content, wherein the similar images comprise digital image data and ones of the similar images are determined to have no substantial differences apparent to human perception;

storing representative images in a memory device, wherein each of the representative images represents at least two of the similar images that are determined to have no substantial differences apparent to human perception; and placing links to the representative images stored in the memory device in the selection of media content, in place of the similar images extracted therefrom, to provide a compressed selection of media content.

2. The method according to claim 1, further comprising determining which ones of the similar images have no substantial differences apparent to human perception, by using a computer to apply an algorithm to the digital image data.

3. The method according to claim 2, wherein the determining step comprises calculating gray-scale distributions for RGB color channels of images from the selection of media content, and determining that any two of the images are similar when differences between numerical parameters of the calculated gray-scale distributions are less than a threshold value.

4. The method according to claim 3, further comprising calculating the numerical parameters selected from the group consisting of a mean, a medium, and a standard deviation, for each RGB color channel of the gray-scale distributions.

5. The method according to claim 3, wherein the threshold value used in the determining step is approximately two percent.

6. The method according to claim 1, further comprising reading the selection of computer-readable media content selected from the group consisting of digitized film frames, regions of interest in digitized film frames, video fields, and regions of interest in video fields.

7. The method according to claim 1, further comprising reading the selection of computer-readable media content selected from the group consisting of a digitized film take and a video program.

8. The method according to claim 1, wherein the placing step further comprises placing the links including information that describes the similar images.

9. The method according to claim 1, further comprising preserving the link through an image operation, the image operation selected from the group consisting of scaling, cropping, resizing, and color correction.

10. The method according to claim 1, wherein the placing step further comprises placing the links operative to cause insertion of corresponding ones of the representative images into the selection of media content when each of the links is traversed.

11. The method according to claim 1, wherein the extracting, storing, and placing steps are performed without subjecting the selection of media content to a lossy compression technique.

12. The method according to claim 1, further comprising using one of the extracted images as a thumbnail.

13. An article comprising a non-transient computer-readable storage medium, the medium storing a compressed selection of media content prepared according to the method of claim 1.

14. A system for compressing a selection of media content comprising digital image data configured in image sequences to provide moving video output, the system comprising a computer-readable storage medium holding instructions operative to perform the steps of:

extracting similar images from a selection of media content, wherein the similar images comprise digital image data and ones of the similar images are determined to have no substantial differences apparent to human perception;

storing representative images in a memory device, wherein each of the representative images represents at least two of the similar images that are determined to have no substantial differences apparent to human perception; and placing links to the representative images stored in the memory device in the selection of media content, in place of the similar images extracted therefrom, to provide a compressed selection of media content.

15. The system according to claim 14, wherein the instructions further comprise instructions for determining which ones of the similar images have no substantial differences apparent to human perception, by using a computer to apply an algorithm to the digital image data.

16. The system according to claim 14, wherein the instructions further comprise instructions for placing the links including information that describes the similar images.

17. The system according to claim 16, wherein the instructions further comprise instructions for preserving the link through an image operation, the image operation selected from the group consisting of scaling, cropping, resizing, and color correction.

18. The system according to claim 14, wherein the instructions further comprise instructions for determining the similar images by calculating gray-scale distributions for RGB color channels for images from the selection of media content, and determining that any two of the images are similar when differences between numerical parameters of the calculated gray-scale distributions are less than a threshold value.

* * * * *